(12) United States Patent
McGinnis

(10) Patent No.: US 9,433,901 B2
(45) Date of Patent: *Sep. 6, 2016

(54) OSMOTIC DESALINATION PROCESS

(71) Applicant: Yale University, New Haven, CT (US)

(72) Inventor: Robert L. McGinnis, Cambridge, MA (US)

(73) Assignee: Yale University, New Haven, CT (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/268,518

(22) Filed: May 2, 2014

(65) Prior Publication Data

US 2014/0238917 A1     Aug. 28, 2014

Related U.S. Application Data

(60) Continuation of application No. 13/086,050, filed on Apr. 13, 2011, now Pat. No. 8,753,514, which is a continuation of application No. 12/431,314, filed on Apr. 28, 2009, now Pat. No. 8,002,989, which is a (Continued)

(51) Int. Cl.
*B01D 11/00* (2006.01)
*C02F 1/44* (2006.01)

(Continued)

(52) U.S. Cl.
CPC .............. *B01D 61/002* (2013.01); *C02F 1/44* (2013.01); *C02F 1/445* (2013.01); *B01D 61/005* (2013.01); *C02F 1/02* (2013.01); *C02F 2103/08* (2013.01); *Y02W 10/37* (2015.05)

(58) Field of Classification Search
CPC .............. B01D 61/002; B01D 61/005; B01D 2317/02; B01D 2311/04; B01D 2311/12; B01D 2311/246; C02F 1/445
USPC ........ 210/644, 652, 650, 767, 770, 775
See application file for complete search history.

(56) References Cited

U.S. PATENT DOCUMENTS 3,130,156 A    4/1964   Neff
3,171,799 A    3/1965   Batchhelder (Continued)

FOREIGN PATENT DOCUMENTS

EP    0121099 B1    6/1988
FR    2102763 A5    4/1972

(Continued)

OTHER PUBLICATIONS

McCutcheon J.R., et al., "A novel ammonia-carbon dioxide forward (direct) osmosis desalination process", *Desalination*, 174:1-11 (2005).

(Continued)

*Primary Examiner* — Ana Fortuna
(74) *Attorney, Agent, or Firm* — McCarter & English, LLP; Danielle L. Herritt; Wei Song

(57) ABSTRACT

An energy efficient desalination process that does not produce waste products involves the extraction of water from a first solution, such as seawater, by using a second concentrated solution to draw the water from the first solution across a semi-permeable membrane. By manipulating the equilibrium of the soluble and insoluble species of solute within the second solution in favor of the soluble species of the solute, a saturated second solution can be used to generate osmotic pressure on the first solution. Also, by adjusting the equilibrium in favor of the less soluble species after the water has been drawn from the first solution, a portion of the solute can easily be precipitated out. Heating the second solution decomposes the solute into its constituent gases. The constituent gases and precipitated solute may be recycled through the process to affect the changes in equilibrium and eliminate waste products. Additionally, by using the waste steam from industrial sources and a heat pump to effectively distribute heat through the present method, the present method exhibits greater energy efficiency than prior art methods.

15 Claims, 2 Drawing Sheets

Related U.S. Application Data division of application No. 10/486,957, filed as application No. PCT/US02/02740 on Feb. 1, 2002, now Pat. No. 7,560,029.

(60) Provisional application No. 60/265,745, filed on Feb. 1, 2001.

(51) Int. Cl.
*B01D 61/00* (2006.01)
*B01D 63/00* (2006.01)
*C02F 1/02* (2006.01)
*C02F 103/08* (2006.01)

(56) References Cited

U.S. PATENT DOCUMENTS

| | | | |
|---|---|---|---|
| 3,216,930 A | 11/1965 | Giew | |
| 3,405,058 A | 10/1968 | Miller | |
| 3,532,621 A | 10/1970 | Hough | |
| 3,617,547 A | 11/1971 | Halff et al. | |
| 3,670,897 A | 6/1972 | Frank | |
| 3,707,231 A | 12/1972 | Bradley | |
| 3,721,621 A | 3/1973 | Hough | |
| 3,906,250 A | 9/1975 | Loeb | |
| 3,978,344 A | 8/1976 | Jellinek | |
| 4,142,966 A | 3/1979 | Perry | |
| 4,778,597 A * | 10/1988 | Bruzzi et al. | 210/644 |
| 4,781,837 A | 11/1988 | Lefebvre | |
| 5,098,575 A | 3/1992 | Yaeli | |
| 5,281,430 A | 1/1994 | Herron et al. | |
| 5,324,428 A | 6/1994 | Flaherty | |
| 5,382,365 A * | 1/1995 | Deblay | 210/644 |
| 6,368,849 B1 | 4/2002 | Norddahl | |
| 6,391,205 B1 * | 5/2002 | McGinnis | 210/644 |
| 7,560,029 B2 | 7/2009 | Mc Ginnis | |
| 7,727,400 B2 | 6/2010 | Flynn | |
| 7,914,680 B2 | 3/2011 | Cath et al. | |
| 8,449,774 B2 * | 5/2013 | Sharif | 210/644 |
| 8,753,514 B2 * | 6/2014 | McGinnis | 210/644 |
| 9,039,899 B2 * | 5/2015 | McGinnis | 210/637 |
| 2005/0145568 A1 | 7/2005 | Mc Ginnis | |
| 2009/0297431 A1 | 12/2009 | McGinnis et al. | |
| 2010/0024423 A1 | 2/2010 | McGinnis et al. | |
| 2010/0108587 A1 | 5/2010 | McGinnis | |
| 2010/0155333 A1 * | 6/2010 | Husain et al. | 210/644 |
| 2011/0036774 A1 | 2/2011 | McGinnis | |
| 2011/0233137 A1 | 9/2011 | Cath et al. | |
| 2012/0228222 A1 * | 9/2012 | McGinnis et al. | 210/637 |
| 2012/0267308 A1 * | 10/2012 | Carmignani et al. | 210/644 |
| 2015/0175447 A1 * | 6/2015 | Sengupta et al. | 210/644 |

FOREIGN PATENT DOCUMENTS

| | | |
|---|---|---|
| JP | 53-032885 B2 | 3/1978 |
| JP | 57-012802 | 1/1982 |
| WO | WO-99/39799 A1 | 8/1999 |
| WO | WO-01/05707 A1 | 1/2001 |
| WO | WO-2008/137082 A1 | 11/2008 |

OTHER PUBLICATIONS

McCutcheon J.R., et al., "Desalination by ammonia-carbon dioxide forward osmosis: Influence of draw and feed solution concentrations on process performance", *Journal of Membrane Science*, 278:114-123 (Elsevier B.V., 2006).

McGinnis R.L., et al., "A novel ammonia-carbon dioxide osmotic heat engine for power generation", *J. Membrane Sci.*, 305:13-19 (2007).

McGinnis R.L., et al., "Energy requirements of ammonia-carbon dioxide forward osmosis desalination", *Desalination*, 207:370-82 (2007).

Murray, W. Bruce, "Desalting Sea Water With Ammonia, Part 2: Osmosis", *Water & Sewage Works*, Nov. 1968, p. 525-528.

Wen et al., "Ammonium Carbonate, Ammonium Bicarbonate, and Ammonium Carbamate Equilibria: A Raman Study", *J. Phys. Chem.*, 99:359-68 (1995).

International Search Report and Written Opinion of the International Searching Authority from PCT/US02/02740 dated Oct. 23, 2002.

* cited by examiner

OSMOTIC DESALINATION PROCESS

RELATED APPLICATIONS

This application is a continuation of U.S. patent application Ser. No. 13/086,050, filed Apr. 13, 2011; which is a continuation of U.S. patent application Ser. No. 12/431,314, filed Apr. 28, 2009 and issued as U.S. Pat. No. 8,002,989, which is a divisional of U.S. patent application Ser. No. 10/486,957, filed Dec. 27, 2004, and issued as U.S. Pat. No. 7,560,029; which is the U.S. National Stage of International Application No. PCT/US02/02740, filed Feb. 1, 2002; which claims the benefit of priority to U.S. Provisional Patent Application No. 60/265,745, filed Feb. 1, 2001 the entire contents of each of which are incorporated herein by reference.

FIELD OF THE INVENTION

The invention relates generally to the field of desalination involving osmosis. More particularly, the invention relates to seawater desalination, brackish water desalination, wastewater purification, contaminated water remediation, or any other separation of solutes and water from an aqueous solution.

DESCRIPTION OF RELATED ART

Due to the abundance of seawater available and the increasing demand for water suitable for drinking and industrial use, seawater desalination continues to be important. Moreover, large scale, economic, and environmentally sound seawater desalination is especially important because increases in the population and the continued expansion of various industries has created a growing need for new and inexpensive sources of potable water. Many diverse methods of desalination have been developed including the technologies of distillation, reverse osmosis, freezing, electrodialysis, ion exchange and forward osmosis. Some of these various methods are detailed in U.S. Pat. No. 3,171,799 to Batchelder, U.S. Pat. No. 3,216,930 to Halff, U.S. Pat. No. 3,670,897 to Frank, and U.S. Pat. No. 5,098,575 to Yaeli.

The primary difficulties presented by these approaches to seawater desalination are adverse environmental impacts and exorbitant water production cost. For example, distillation and reverse osmosis are the most widely employed desalination methods. But both methods produce a process waste stream or brine discharge. Since these processes can only extract a portion (15-50%) of the water from saltwater, the remaining seawater—with its increased salinity—is returned to the seawater source. Over a period of time, this waste stream or brine discharge can cause the average salinity of the environment to increase. Moreover, if the desalination process utilizes distillation, the temperature of the waste stream will be higher than the surrounding environs and this may also adversely affect the environment. The long term impact of the waste stream and the brine discharge on the environment are uncertain. But this impact is a significant consideration when constructing seawater desalination plants and has become a primary obstacle to the use of these plants.

These widely employed desalination methods are also expensive. It typically costs twice as much or more to produce fresh water from seawater desalination than when water is obtained by other means. For example, the average cost to the Southern Metropolitan Water District (of California) of water from the Colorado River and northern California sources is $450/Acre-ft. The same quantity of water produced by reverse osmosis or distillation has an average cost of $977/Acre-ft., with possible savings on economies of scale reducing the cost to $700/Acre-ft for large quantities over a long term of use. The combination of environmental impact and cost has made sea water desalination prohibitive for all but the most water-scarce environments.

Forward or natural osmosis has also been used for desalination. In general, the forward osmosis desalination process involves a container having two chambers separated by a semi-permeable membrane. One chamber contains sea water. The other chamber contains a concentrated solution that generates a concentration gradient between the saltwater and the concentrated solution. This gradient draws water from the saltwater across the membrane, which selectively permits water to pass but not salt, into the concentrated solution. Gradually, the water entering the concentrated solution dilutes the solution. The solutes are then removed from the dilute solution to generate potable water.

In particular, U.S. Pat. No. 3,130,156 to Neff and U.S. Pat. No. 3,532,621 to Hough are directed to forward osmosis desalination processes. The Neff patent discloses a forward osmosis process in which a 2 molar solution of ammonium bicarbonate is used to draw water from seawater across a semi-permeable membrane. According to Neff, the dilute solution is then heated to decompose the ammonium bicarbonate solute into its constituent gases. The gases are then released from the solution, leaving behind potable water. The gases released from the solution in the process disclosed in the Neff patent are then compressed or cooled to generate ammonium bicarbonate that is recycled into the concentrated solution in the first step of the process. The Neff patent recognizes that this results in the removal of only a small amount of water from larger quantities of saltwater (low yield). Also, considerable amounts of energy are still needed to vaporize the gas constituents of the solute. Like Neff, the Hough patent discloses a forward osmosis process in which a concentrated solution is used to draw the water from the seawater across a semi-permeable membrane. However, unlike Neff, the Hough patent precipitates the solute out of the solution and recycles the precipitate back into the concentrated solution. According to Hough, expendable or separately recyclable solutes may be needed as reagents for this precipitation and pH adjustment, and further solutes may be needed to balance the pH of the potable water after the precipitation step. These further pH adjustments may result in further precipitation that must be discharged as waste. Thus, these desalination processes fail to remove substantial portions of drinkable water from sea water (high yields) and still require too much energy and result in too high an environmental impact (due to insufficient yield and subsequent brine discharge) to implement them on a larger scale.

What is needed is the desalination of seawater or other aqueous solutions, in a simple straightforward process which is economically and environmentally superior to existing aqueous separation processes. This process should also be scalable so that water may be treated on as large a scale as desirable. More particularly what is needed is a forward osmotic desalination process which substantially removes most of the water from the saltwater source and recycles all solutes so as to significantly reduce or eliminate the brine discharge and associated environmental impacts of existing desalination methods. To accomplish this, the equilibrium of more soluble to less soluble solutes would be adjustable to maximize the concentration gradient between the draw solution and the seawater, and, thereby the amount of water removed from the saltwater. This manipulation of equilibrium may then be used to remove said solutes with the minimum energy expense, providing for a high quality dilute water product. What is further needed is a process that uses energy provided by cheap readily available heat sources, such as waste steam from power plants or industrial facilities, or from thermal solar collectors.

SUMMARY OF THE INVENTION

The invention provides a method of obtaining a high yield of solvent from desalination without the excessive energy demands and/or environmentally harmful waste discharge associated with the prior art methods of desalination. The invention achieves this by using a method of forward osmosis in which the concentration of a second solution is increased, through equilibrium shifts in the solutes contained within the second solution, to a point where the second solution can withdraw most of the solvent from a first solution. Through this manipulation of equilibrium, the present invention is able to separate a solvent from undesirable solutes in an energy efficient manner that results in high yields and permits the recycling of the solutes within the process.

The inventive osmotic method of desalination is illustrated by a first embodiment of the invention in which a first solution is exposed to a first surface of a semi-permeable membrane. A second solution that has a concentration greater than that of the first solution is exposed to a second opposed surface of this membrane. The concentration of the second solution is increased by using a first reagent to adjust the equilibrium of solutes within the second solution to increase the amount of a soluble species of solute within second solution. The concentration gradient between the first and second solutions then draws the solvent from the first solution through the semi-permeable membrane and into the second solution producing a solvent-enriched solution. A portion of the solutes are then precipitated and filtered out of the solvent-enriched second solution. The remaining solutes within the solvent-enriched second solution are removed by heating the solvent-enriched second solution to decompose the remaining soluble and less soluble species of solutes into their constituent gases to produce a solvent.

In one embodiment, the first solution may be seawater, brackish water, wastewater, contaminated water, or other aqueous solutions. Additionally, the solvent in the present invention may be water in preferred embodiments. In a further preferred embodiment, the second solution may be a concentrated solution of ammonia and carbon dioxide, with resultant aqueous species: ammonium carbonate, ammonium bicarbonate, and ammonium carbamate.

In another embodiment, the semi-permeable membrane may allow the passage of water, but exclude the dissolved solutes sodium chloride, ammonium carbonate, ammonium bicarbonate, and ammonium carbamate.

In another embodiment, the first reagent may be comprised of a mixture of carbon dioxide and ammonia gases. The first reagent may also be the constituent gases which are recycled after being released from solution when the solute is decomposed. In a further embodiment, the second solution may be heated to about 50 to 58° C. to increase the concentration of the second solution. The concentration of the second solution may be at least 6 molal in a preferred embodiment. In one embodiment, the solvent-enriched second solution may be cooled to about 18 to 25° C. prior to subjecting the solvent-enriched second solution to the second reagent if the second solution was previously heated.

In another embodiment, the concentrated first solution resulting from the forward osmosis process may be pumped to solar evaporation tanks. In an alternative embodiment, precipitates may be filtered from the concentrated first solution.

In a further embodiment, the portion of solute may be precipitated out of the solvent-enriched second solution by adjusting the equilibrium of the solvent-enriched second solution to increase the amount of a less-soluble solute present in the solution. This may be done by adding a second reagent causing a portion of the less-soluble species to precipitate out of the solvent enriched second solution. In one embodiment, the second reagent may be carbon dioxide gas.

In yet another embodiment, the heat used to decompose the remaining soluble and less-soluble species may be waste steam from power or industrial plants, solar, geothermal, or heat pumped by heat exchange the heat being produced by the exothermic introduction of the first and second solutes into the second solution. The constituent gases released upon heating of the solvent-enriched solution may be ammonia and carbon dioxide.

In a preferred embodiment, the osmotic method may include the additional steps of introducing a remaining portion of the first reagent, as the second reagent, to the solvent-enriched solution; recycling the precipitated less-soluble species of solvent to the second solution after filtration; and recycling the constituent gases, as the first reagent, after heating the solvent enriched second solution.

In a further embodiment, the solvent may be subjected to at least one of the processes of pH balancing and supplementing with additional solutes.

In a second embodiment, the osmotic method for extracting water from an aqueous solution starts by exposing the aqueous solution to a first surface of a semi-permeable membrane. The equilibrium of a second solution may be adjusted to increase the amount of ammonium carbamate present in the solution by adding a first gas of ammonia and carbon dioxide, wherein the ammonia present in the first gas is preferentially adsorbed by the second solution. This increases the concentration of the second solution so that it is greater than that of the aqueous solution. The second solution may then be exposed to a second opposed surface of the semi-permeable membrane. Water may then be drawn from the aqueous solution through the semi-permeable membrane and into the second solution generating a water-enriched solution. The equilibrium of the water-enriched solution may then be adjusted to increase the amount of ammonium bicarbonate present in the solution by adding a second gas which may be the carbon dioxide gas remaining from the first equilibrium adjustment. This equilibrium adjustment causes a portion of the ammonia bicarbonate to precipitate out of the water-enriched solution and is then filtered out of the water-enriched solution. This precipitated ammonia bicarbonate may be recycled to the second solution. The remaining water-enriched solution may be heated to decompose the remaining ammonia carbamate and ammonium bicarbonate into ammonia and carbon dioxide to produce potable water. The ammonia and carbon dioxide gases released from solution may then be recycled as the first gas in the present osmotic method.

The present invention also relates to an apparatus for the extraction of a solvent from a first solution using osmosis comprising. In an embodiment of the apparatus, the apparatus has a first chamber with an inlet and an outlet. The inlet of the first chamber may be connected to a source of the first solution. A semi-permeable membrane separates the first chamber from a second chamber. The second chamber has an inlet and a first and second outlet. A third chamber receives a solvent-enriched second solution from the first outlet of the second chamber and a reagent from the second outlet of the second chamber. The third chamber has an outlet which is connected to a filter for filtering the water-enriched second solution. The filter has a first and second outlet: the first outlet is connected to the inlet of the second chamber in order to recycle a precipitated solute to the second chamber; and a fourth chamber receives the solvent enriched second solution from the second outlet of the filter. The fourth chamber has a heater for heating a solvent-enriched second solution. A first outlet in the fourth chamber returns constituent gases to the inlet of the second chamber. A second outlet in the fourth chamber permits the final product, the solvent, to exit the apparatus.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DESCRIPTION OF THE PREFERRED EMBODIMENTS

Figure 1:
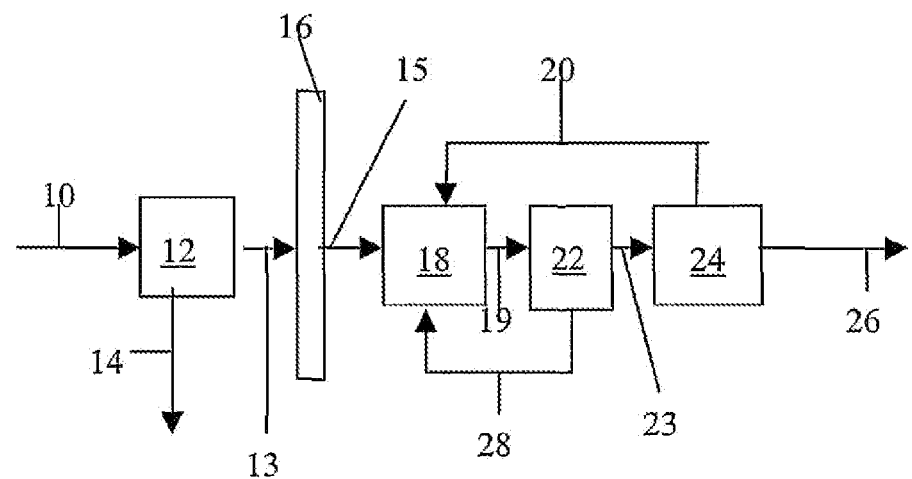
FIG. 1 is a schematic diagram of the desalination method in accordance with the invention.

The invention is generally directed to a method and apparatus for desalination. The method of the invention is shown and described with reference to FIGS. 1 and 2. The apparatus is shown and described with reference to FIG. 3. Throughout the description like reference numerals are used in all the figures to describe like features.

FIG. 1 shows an overview diagram of a forward osmotic desalination method in accordance with the invention, the details of which will then be described with reference to FIG. 2. As shown in FIG. 1, the solution, for example, seawater, brackish water, wastewater, contaminated water or other solution, referred to as the first solution is disposed in a first chamber (12), as illustrated by reference numeral (10). First chamber (12) is in fluid communication with a semi-permeable membrane (16) as illustrated by arrow (13). A second solution having a concentration greater than the first solution is contained in second chamber (18). The higher concentration solution enables the solvent, i.e., the water, from the first solution in the first chamber (12) to osmose across the semi-permeable membrane (16) into the more concentrated second solution located within the second chamber (18) as illustrated by arrow (15)—a process referred to as forward osmosis. Having lost much of its solvent, the remaining first solution in the first chamber (12) is predominantly solute, e.g., bulk salt in the case of seawater, as discussed later, and is discarded as illustrated by arrow (14). The resulting solvent-enriched second solution in the second chamber (18) is then introduced, as illustrated by arrow (19), into a third chamber (22). In third chamber (22) solutes in the solvent-enriched second solution may be precipitated out and recycled back into second chamber (18), as illustrated by arrow (28), to maintain the concentration of the second solution. The remaining solvent-enriched second solution in the third chamber (22) is then introduced, as illustrated by arrow (23), into a fourth chamber (24). In the fourth chamber (24) the remaining solvent enriched second solution may be heated to remove any remaining solutes to produce the final result, the solvent, i.e., potable water, illustrated by arrow (26). Because in the fourth chamber (24) the heat removes any remaining solutes by breaking them down into their constituent gases, the gases may be returned to the second chamber (18) as illustrated by arrow (20) to maintain the concentration gradient of the second solution in chamber (18) and act as reagent, as discussed in more detail below.

Figure 2:
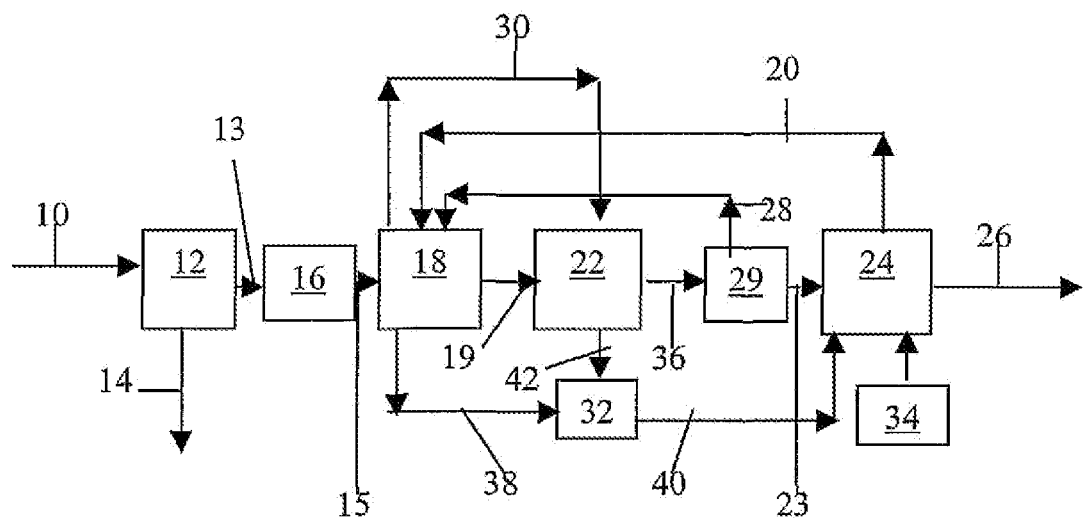
FIG. 2 is a more detailed schematic diagram of the desalination method in accordance with the invention.

Referring now to FIG. 2, the details of the method in accordance with the invention will be discussed. As discussed above, the process starts with the first solution contained within the first container (12). The first solution is an aqueous solution, one in which water is the primary solvent, that is being treated, either for the purpose of potable water recovery or for the removal of undesirable solutes. Included among these undesirable solutes are undesired chemically precipitable soluble salts such as sodium chloride (NaCl). Typical examples of the first solution include aqueous solutions such as seawater, brine and other saline solutions, brackish water, mineralized water, industrial waste water, and so forth. Although the first solution described herein is preferably aqueous solutions, use of non-aqueous solutions such as those of organic solvents in the methods of the present invention are also contemplated. The first solution may be filtered and pre-treated in accordance with the practice in the desalination art in order to remove solid and chemical wastes, biological contaminants, and otherwise prevent membrane fouling, prior to desalination and is then supplied to the first chamber (12) as indicated by arrow 10.

A semi-permeable membrane (16), which separates the first chamber (12) from the second chamber (18), separates solutes from the solvent as the solvent of the first solution osmoses into the second solution. Many types of semi-permeable membranes (16) are suitable for this purpose provided that they are capable of allowing the passage of the water (i.e., the Solvent) while blocking the passage of the solutes and not reacting with the solutes in the solution. The membrane (16) can have a variety of configurations including thin-films, hollow fiber membranes with thin walls or fabric like configurations consisting of hollow fibers and monofilaments, asymmetric and composite membranes in a spiral wound and disk tube configurations, and so forth. There are numerous commercially available semi-permeable membranes that are characterized by having pores small enough to allow water to pass while screening out solute molecules such as sodium chloride (NaCl) and their ionic molecular species such as chloride. Such semi-permeable membranes can be made of organic membranes made of materials such as cellulose acetate, cellulose nitrate, polysulfone, polyvinylidene fluoride, polyamide and acrylonitrile co-polymers; mineral membrane or ceramic membranes made of materials such as $ZrO_2$ and $TiO_2$; and so forth. Preferably, the material selected for use as the semi-permeable membrane (16) should be able to withstand temperatures as high as 60° C. and a pH of about 10, since the second solution maybe slightly alkaline, about 8 to 9.6 pH. The membranes used in the methods of the invention need not be made out of one of these materials;

they can be composites of various materials already mentioned. Given the efficiency of the present method, the overall surface area of the membrane (16) used can be greatly reduced in comparison to the prior art methods of desalination.

Like the first solution, the second solution is preferably an aqueous solution, i.e., the solvent is water, but the use of non-aqueous solutions such as organic solvents in the methods of the present invention is also contemplated.

The second solution has a concentration greater than that of the first solution. This is achieved using solutes that are soluble enough to produce a solution that has a higher concentration than the first solution. Preferably, the solute within the second solution should (1) be easily removable from the second solution through precipitation or decomposition; (2) form at least one species that is more readily dissolved in the solvent of the second solution, i.e., the soluble species, and one species that is not readily dissolved within the solvent, i.e., the less soluble species; and (3) posses no health risk if trace amounts of the species of solute remain in the resulting solvent. The existence of the soluble and less-soluble species of solutes allows for the solutions to be adjusted or manipulated as needed. Typically, the soluble and less-soluble solute species reach a point in solution in which, under the particular condition temperature, pressure, pH, etc., neither species of solute is either increasing or decreasing with respect to the other, i.e., the ratio of the soluble to insoluble species of solute is static. This is referred to as equilibrium. Given the particular conditions of the solution, the species of solute need not be present in a one to one ratio at equilibrium. Through the addition of a chemical, referred to as a reagent, the balance between the species of solutes can be shifted. Using a first reagent, the equilibrium of the solution can be shifted to increase the amount of the soluble species of solute. Likewise, using a second reagent, the equilibrium of the solution may be shifted to increase the amount of the less-soluble solute species. After the addition of the reagents, the ratio of species of solutes will stabilize at a new level which is favored by the conditions of the solution. By manipulating the equilibrium in favor of the soluble species of solute, the present invention is able to achieve a second solution with a concentration near saturation, a state in which the solutions solvent cannot dissolve anymore of the solute.

The preferred solutes for the second solution within the second chamber (18) are ammonia and carbon dioxide gases and their products, ammonium carbonate (($NH_4$)$_2CO_3$), ammonium bicarbonate ($NH_4HCO_3$), and ammonium carbamate ($NH_2COONH_4$). Ammonia and carbon dioxide, when dissolved in water at a ratio of about 1, form a solution comprised primarily of ammonium bicarbonate and to a lesser extent the related products ammonium carbonate and ammonium carbamate. The equilibrium in this solution favors the less-soluble species of solute, ammonium bicarbonate, over the soluble species of solute, ammonium carbamate and to a lesser extent ammonium carbonate. Buffering the solution comprised primarily of ammonium bicarbonate with an excess of ammonia gas so that the ratio of ammonia to carbon dioxide increases to about 1.75 to 2.0 will shift the equilibrium of the solution towards the soluble species of the solute, ammonium carbamate. The ammonia gas is more soluble in water and is preferentially adsorbed by the solution. Because ammonium carbamate is more readily adsorbed by the solvent of the second solution, its concentration can be increased, preferably, to the point where the solvent cannot adsorb anymore of the solute, i.e. saturation. In the present invention, the concentration of solutes within this second solution achieved by this manipulation is greater than about 2 molal, preferably more than about 6 molal, most preferably about 6 to 12 molal.

Ammonia gas is a preferred first reagent for ammonium carbamate since it is one of the chemical elements that results when the solute ammonium carbamate is decomposed, otherwise referred to as a constituent element. In general, it is preferred that the reagent for the solvent be a constituent element of the solute since any excess reagent can easily be removed from the solution when the solvent is removed, and, in a preferred embodiment the constituent element can be recycled as the first reagent as discussed further below. However, other reagents that can manipulate the equilibrium of the solute species in solution are contemplated so long as the reagent is easily removed from the solution by precipitation or decomposition and the reagent posses no health risk if trace elements of the reagent remain within the final solvent.

In addition to manipulating the equilibrium of the solute species, the concentration of the second solution can be further increased by raising the temperature of the solution. For example, by raising the temperature of the second solution to about 50 to 55° C. the concentration of ammonium carbamate within the solution can be increased about two-fold from about 6 to 10 molal to about 15 to 18 molal and may generate a hyper-saturated solution—a solution in which the solvent has adsorbed more solutes than it can at room temperature. However, the temperature of the solution should not exceed the temperature at which the solutes decompose, which in the case of ammonium carbamate is about 58° C.

The present process begins by bringing the first solution and the second solution into contact with the first and second sides of the semi-permeable membrane (16), respectively. Although the first and second solutions can remain stagnant, it is preferred that both the first and second solutions are introduced by cross flow, i.e., flows parallel to the surface of the semi-permeable membrane (16). This increases the amount of surface area of the semi-permeable membrane (16) a given amount of the solutions comes into contact with thereby increasing the efficiency of the forward osmosis. Most preferably, the first and second solutions will circulate in opposite directions. Since the second solution in the second chamber (18) has a higher solute concentration 15 than the first solution in the first chamber (12), the solvent in the first solution diffuses to the second solution by forward osmosis—water's natural tendency to move from the less concentrated solution to a more concentrated solution. The difference in concentration between the two solutions is so great that the solvent passes through the semi-permeable membrane (16) without the addition of pressure to the first solution. For example seawater typically has a salt concentration of about 0.6 molal, which is significantly less than the solute concentration of about 6-10 molal within the second solution. The concentration gradient between the first solution (saltwater) and the second solution (saturated with ammonium carbamate) generates an osmotic pressure of about 150 atm on the first solution. The typical pressure exerted on saltwater in reverse osmosis is about 50 to 70 atm. This permits the flow rate of water from the saltwater across the semi-permeable membrane (16), otherwise known as flux, in the present invention to be at least about 2 to 3 times the flux achieved using reverse osmosis. The flux can be further increased by applying external pressure to the first solution.

During the desalination process, the first solution becomes more concentrated as it loses solvent and the second solution becomes more diluted as it gains solvent. Despite this occurrence, the concentration gradient between the two solutions remains significant. For example, when the solutions are stagnant the first solution becomes saturated when it experiences an approximately 90% decrease in volume. At this point, the solutes contained within the first solution begin to precipitate. Yet, throughout the final 10% reduction of the first solution, the rate of flow remains significant. Despite the ability of the present process to maintain a significant rate of flow throughout the process, it is preferred when the solutions are stagnant or circulated them additional solutes are introduced to the second solution to maintain the second solutions concentration at about the concentration it had before it came into contact with the first solution. Preferably the additional solutes are recycled within the process as discussed further below. This maintains the increased flux of water across the semi-permeable membrane (16).

Overall, this process results in the removal of about 95 to 99% of the solvent contained within the first solution due largely to the increased concentration of the second solution resulting from the equilibrium shift induced by the addition of the first reagent. Overall, this process results in an average rate of flow across the membrane (16) that appears to be significantly higher than the average rate of flow of the reverse osmosis process. Further efficiencies are achieved in comparison to reverse osmosis since forward osmosis across the membrane (16) does not compact the membrane as commonly occurs with the mechanical pressure used in reverse osmosis. Additionally, with the flow rates of the present invention, the overall surface area of the semi-permeable membrane (16) can be reduced without affecting the overall efficacy of the process, also resulting in substantial savings.

The discharge (14), i.e., the concentrated first solution referred to as a brine discharge, has a greater concentration of solutes, such as sodium chloride (NaCl). Thus, the excess solutes can be removed from the concentrated first solution prior to returning the first solution to its source or recirculating the first solution through the present method. This can be done, for example, by contacting the concentrated first solution with a solar evaporator, a mechanism of simple screen filtration, hydrocyclone, or a precipitation mass or other nucleation point, to remove the precipitate of the excess solute. This excess solute, typically sodium chloride (NaCl), may be further processed to make it suitable for consumer or industrial purposes.

Having adsorbed the solvent of the first solution by forward osmosis, it is then necessary to remove the solutes from the solvent-enriched second solution to obtain only the solvent. This can be accomplished by precipitating the solutes out of the solution or decomposing the solutes into their constituent gases that vaporize out of solution. Preferably a combination of precipitation and decomposition is used to ensure the energy efficient removal of all the solutes. By removing a portion of the solutes by precipitation the amount of energy required to heat the solution to decompose the remaining solutes is reduced, and decomposition results in the complete removal of the solutes. These precipitation and decomposition steps are described with reference to the third and fourth chamber (22, 24), respectively.

The solvent-enriched second solution in the second chamber (18) is withdrawn to a third chamber (22), as shown by arrow (19). The solvent-enriched second solution is then treated to remove a portion of the solutes from the solvent-enriched solution by precipitation. A second reagent is introduced to adjust the equilibrium of the soluble and less-soluble solute species in favor of the less-soluble solute species. As with the first reagent, any chemical capable of adjusting the equilibrium is suitable so long as it is easily removed from the solvent-enriched second solution and poses no health risk. Preferably the reagent is a constituent element of the solute, and in the case of the preferred solute ammonium carbamate is carbon dioxide gas. When the solvent-enriched second solution is diffused with carbon dioxide, the ratio of ammonia to carbon dioxide in solution is reduced to about 1.25 and the equilibrium in the solvent-enriched second solution shifts back towards the less-soluble species of solute, ammonium bicarbonate. The less-soluble species of solute then precipitates out of solution. The precipitation of the ammonium bicarbonate results in a substantial reduction in the concentration of solutes within the solvent-enriched second solution to about 2 to 3 molal. Preferably, the temperature of the solvent-enriched second solution in the third chamber (22) is lowered to about 18 to 25° C., preferably 20 to 25° C. to assist in the precipitation of the solute.

The precipitated solute is then filtered from the solution. Although this can be done within the third chamber (22), the solution is preferably directed to a filtration chamber (29) as shown by arrow (36). Using well known methods, such as a hydrocyclone, sedimentation tank, column filtration, or simple screen filtration, the precipitated solute is removed from the solvent-enriched solution. Preferably, the precipitate is allowed to settle out of solution by gravity and is then siphoned off. The remaining solvent-enriched second solution is transferred from the filter chamber (29) to a fourth chamber (24), as shown by arrow (23), where it is then heated to decompose the solutes into their constituent gases. In the preferred embodiment, these constituent gases may be ammonia and carbon dioxide. The energy required for the separation process is that heat required to raise the temperature of the solution from approximately 15-18° C. (sea water temperature) to approximately 30 to 60° C., more preferably about 60° C. (for the complete removal of the ammonium carbamate solute), but no higher than 100° C. Additional heat is also required to make up for the inefficiency of heat transfer of the enthalpies of vaporization and solution of the solutes recycled within the process. This heating causes the remaining solutes in the solvent-enriched second solution to decompose into constituent gases, which leave the solution. Preferably, a vacuum or air flow is maintained over the water-enriched second solution while it is being heated in order to improve the efficiency with which the decomposition gases vaporize out of solution. By generating the air flow over the fourth chamber it may be possible to remove all the solutes at a lower temperature than typically used. This decomposition results in a potable water product which may be further treated by the addition of solutes such as chlorine or fluorine. In general, the potable water product should have a pH of about 7, further pH adjustments may be necessary to make the water suitable for its intended purpose.

The solvent-enriched second solution is heated using a combination of external heat sources (34) and heat pumped through a heat exchanger (32) from the exothermic introduction of gases and solutes (38, 42). The external heat source (34) may be supplied by any thermal source including solar and geothermal energy, but the sources are expected to be similar to those of distillation—primarily from cogeneration environments, making use of waste heat from power generation or industrial processes. Furthermore, the process efficiency may be maintained by using a heat exchanger (32) to capture the heat released during the previous steps in the present method of desalination. As shown by the arrows (38) and (42) in FIG. 2, heat released from the chemical reactions within the second and third chambers (18, 22) is pumped to the heat pump (32) that then pumps this heat to the fourth chamber (24) to assist in heating the solvent-enriched second solution, as shown by arrow (40). In an alternative embodiment, additional heat is generated by allowing the constituent gases released to condense on the exterior of the chamber (24) in which the solvent-enriched second solution is being heated, thus, transferring the energy from this exothermic reaction to the fourth chamber (24). The condensate, which in the preferred embodiment is ammonium carbamate, is then recycled to the second solution in the second chamber (18).

It is also preferable to recycle the solutes and solute constituents removed from the second solution to limit the environmental impact and cost of the present method of forward osmosis desalination. The precipitated solute discarded from the filtration chamber may be recycled to the second chamber (18) where it can dissolve in the second solution and thereby maintain the high concentration of the second solution, as shown by arrow (28). Additionally, the constituent gases removed from the solvent-enriched second solution in the fourth chamber (24) can be recycled back to the second or third chambers (18, 22) as shown by arrows (20) and (30), respectively, where they act as reagents. In the preferred embodiment, the ammonium carbamate is decomposed into its constituent gases: ammonia and carbon dioxide. These gases are then recycled to the second chamber (18) as shown by arrow (20). Since the ammonia is more soluble than the carbon dioxide the ammonia is preferentially adsorbed by the second solution and acts as a reagent by adjusting the equilibrium of the solute species in favor of ammonia carbamate. The remaining carbon dioxide is withdrawn from the second chamber (18), as shown in arrow (30), and transferred to the third chamber (22) where it acts as a reagent and alters the equilibrium of the second solution in favor ammonium bicarbonate. Since the preferred embodiment of the present invention contemplates recycling the constituent gases derived from the decomposition of the solutes, it may be necessary to precipitate less than optimal amounts of the solutes to ensure that enough gas is recycled to maintain the efficiency of the present process. Typically, removing about half of the solutes from solution by precipitation should assure that sufficient amounts of the constituent gases will be generated to maintain the present process.

The process described herein may be conducted continuously, or in batches, to better isolate the solutions in throughout the process.

Figure 3:
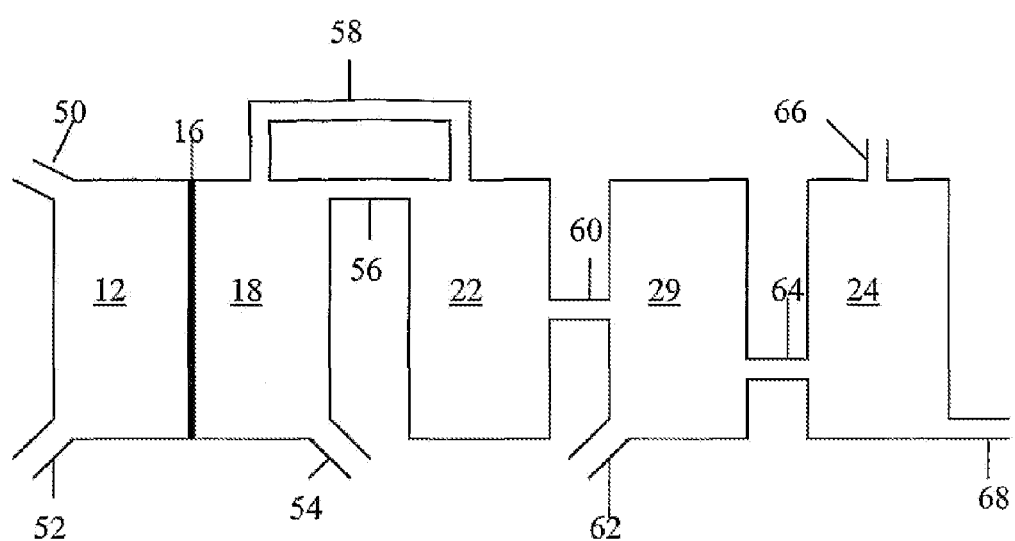
FIG. 3 is a diagram of the apparatus used in the desalination method in accordance with the invention.

An apparatus for conducting the present method is detailed within FIG. 3. The apparatus has a first chamber (12) that has an inlet (50) and outlet (52). The inlet for the first chamber (50) is in communication with a source for the first solution, such as a holding tank for solution having undergone pre-treatment or to a natural source for the first solution, such as the sea, a lake, stream and other bodies of water and waterways. The inlet for the first chamber (50) may incorporate a pump in order to siphon the first solution from its source. It also may optionally include heating or cooling devices in order to adjust the temperature of the first solution. Similarly, the outlet for the first chamber (52) may incorporate a pump in order to extract the first solution from the first chamber (12). The outlet (52) maybe used to recirculate the first solution directly to the source for the first solution, although preferably, the first solution will be pumped into or across a precipitation device prior to being returned to the source of the first solution. Such a precipitation device may include a solar evaporation bed, mechanism of simple screen filtration, hydrocyclone, or a precipitation mass or other nucleation point, or other types known to those skilled in the art. The first chamber (12) is separated from a second chamber (18) by a semi-permeable membrane (16).

The second chamber (18) has an inlet (54) and a first and second outlet (56, 58). The inlet (54) provides a source for the second solution and may incorporate a pump as well as heating device. The first outlet for the second chamber (56) is in communication with a third chamber (22), and provides a conduit for transferring the solvent-enriched second solution to the third chamber (22). This first outlet for the second chamber (56) can incorporate a pump to withdraw the water-enriched second solution from the second chamber (18). In another embodiment of the present invention, the first outlet for the second chamber (56) may incorporate a cooling device to cool the solvent-enriched second solution as discussed above. The second outlet for the second chamber (58) provides a conduit for any remaining first reagent, which in the preferred embodiment would be carbon dioxide gas, to be transferred to the third chamber (22).

The third chamber (22) is where a portion of the solute is precipitated out of the water enriched solution. The third chamber (22), in addition to the inlets for (56) and (58), has an outlet (60) in communication with a filtration device (29) for separating the precipitate from the solvent-enriched solution. The filtration device (29) is of any of the types disclosed above, although it preferably is a sedimentation tank. The filtration device (29) has two outlets: the first outlet (62) may be used to dispose of the precipitated solute or return it to the second chamber (18) through the second chamber inlet (54), and the second outlet (64) may transfer the remaining solvent-enriched second solution to the fourth chamber (24). In an alternate embodiment, the filtration device (29) may be incorporated into the third chamber (22) in which case the third chamber (22) will have an additional outlet, one outlet to transfer the remaining solvent-enriched second solution to the fourth chamber (24) and another outlet to dispose of the precipitated solute or, in the preferred embodiment, return the precipitate to the second chamber (18) through the second chamber inlet (54).

The fourth chamber (24) incorporates a heating device for heating the remaining solvent-enriched second solution. The fourth chamber (24) also incorporates a first outlet (66), which may incorporate a vacuum, fan, or other device for generating airflow, for venting the constituent gases. Preferably, the first outlet for the fourth chamber (66) is in communication with the inlet (54) for the second chamber (18) to recycle the constituent gases as the second solute. The second outlet (68) acts as a conduit for withdrawing the final potable water product.

Any materials may be used to construct the various holding and/or storage devices (chamber, vessels and receptacles), conduits, piping, and related equipment, as long as they will withstand the weight of the solutions, and be unreactive with any solutes within the solutions. Typical materials are non-corrosive, non-reactive materials such as stainless steel, plastic, polyvinyl chloride (PVC), fiberglass, and so forth. The vessels can take any suitable configuration, but are typically cylindrical tanks, contoured or fitted tanks, and so forth. The receptacles are typically water towers, cylindrical tanks, contoured or fitted tanks, and so forth. As discussed above, it is important to note that the chambers are shown as separate units but the invention is not limited to that configuration, and where appropriate, i.e., the first and second chambers (12, 18), can be contained within a single vessel partitioned into two chambers separated by the semi-permeable membrane (16).

The size and configuration of the holding device are not critical to the invention. It is contemplated that the present desalination process would be implemented on a scale suitable for generating potable water suitable for use within communities or for industrial use. However, it is also contemplated that the size and configuration of the process can be scaled so as to provide potable water on a smaller scale such as to campers and boaters as well.

The heating and cooling devices can be electrical heaters, refrigeration units, solar collectors, and heat exchangers such as steam condensers, circulators and so forth, such as are well known in the art, but preferably heat exchangers. The heating and cooling devices, along with any other equipment used within the process of the present invention, that may have power requirements, can derive their energy from any variety of commonly used sources, including by means of illustration and not limitation, waste steam, solar energy, wind or geothermal energy, and conventional sources.

Although the present invention has been illustrated and described in connection with saltwater, it is to be understood that the present invention is not restricted to saline water and the units or present invention can be used for extracting various types of solvents from many types of solutes so long as the solvent can withstand the pH and temperature of the ammonium carbamate solution. Additionally, the present method would be suitable for the concentration of various solutes such as salt or sugar and drugs or other compounds.

Accordingly, it is to be understood that the embodiments of the invention herein described are merely illustrative of the application of the principles of the invention. Reference herein to details of the illustrated embodiments is not intended to limit the scope of the claims, which themselves recite those features. It should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method for extracting a solvent from a solution using forward osmosis, the method comprising the steps of:
    providing a semi-permeable membrane;
    introducing a first solution to a first surface of the semi-permeable membrane;
    introducing a second solution to a second surface of the semi-permeable membrane, wherein the second solution comprises at least two species of a solute, a soluble species of the solute and a less soluble species of the solute, where the ratio of the soluble species of the solute to the less soluble species of the solute is greater than 1:1 at equilibrium so as to generate an increased osmotic pressure on the first solution;
    drawing a solvent from the first solution through the semi-permeable membrane and into the second solution, thereby creating a solvent-enriched second solution; and
    removing at least one of the at least two species of the solute from the solvent-enriched second solution, wherein the step of removing at least one of the at least two species of the solute comprises:
        exposing the solvent enriched second solution to a heat source;
        decomposing at least one of the at least two species of the solute into constituent gases;
        vaporizing the constituent gas out of the solvent-enriched second solution, wherein the heat source is derived from at least one of solar, wind, or geothermal energy, and
        recovering at least a portion of the solvent from the solvent-enriched second solution.

2. The method of claim 1, wherein the second solution comprises a concentrated solution of ammonia and carbon dioxide, ammonium carbonate, ammonium bicarbonate, and ammonium carbamate.

3. The method of claim 1, wherein the first solution comprises at least one of seawater, brackish water, wastewater, contaminated water, or other aqueous solution.

4. The method of claim 1, further comprising the step of recycling the constituent gases back into the second solution to maintain a desired concentration of the second solution.

5. The method of claim 1, wherein the step of removing at least one of the at least two species of the solute further comprises adjusting an equilibrium of the solvent-enriched second solution to increase an amount of the less-soluble species of the solute.

6. The method of claim 5, wherein the step of adjusting the equilibrium comprises adding a reagent to the solvent-enriched second solution to cause a portion of the less soluble species of the solute to precipitate out of the solvent-enriched second solution.

7. The method of claim 1, wherein the step of removing at least one of the at least two species of the solute further comprises filtering the solvent-enriched second solution previous to exposing to the heat source.

8. The method of claim 1, further comprising the step of recycling the at least one species of the solute removed from the solvent-enriched second solution back into the second solution to maintain a desired concentration of the second solution.

9. The method of claim 1, further comprising the step of applying an external pressure to the first solution to increase solvent flux through the semi-permeable membrane.

10. The method of claim 1 further comprising the step of manipulating the ratio of the soluble species of the solute to the less-soluble species of solute to increase the solute concentration in the second solution to about 6 molal.

11. The method of claim 1 further comprising the step of manipulating the ratio of the soluble species of the solute to the less-soluble species of solute to increase the solute concentration in the second solution to between 6 molal and 12 molal.

12. An apparatus for the extraction of a solvent from a first solution using forward osmosis comprising:
    a first chamber for receiving a first solution;
    a second chamber containing a second solution, wherein the second solution comprises ammonia and carbon dioxide in a molar ratio of greater than 1:1 at equilibrium so as to generate an increased osmotic pressure on the first solution;

a semi-permeable membrane coupling the first chamber and the second chamber, wherein the semi-permeable membrane allows a solvent from the first chamber to pass through to the second chamber, thereby producing a solvent-enriched second solution in the second chamber; and a heating chamber coupled to the second chamber for removing at least one of the ammonia and carbon dioxide from the solvent-enriched second solution, wherein the heating chamber comprises a heat exchanger in communication with a heat source to decompose at least one of the ammonia and carbon dioxide into constituent gases and vaporize the constituent gases out of the solvent-enriched second solution in the heating chamber, wherein the heat source is derived from at least one of solar energy, wind energy, or geothermal energy.

13. The apparatus of claim 12, wherein the apparatus further comprise a filtration module.

14. The apparatus of claim 12 further comprising recycling means for recycling the constituent gases of at least one of the ammonia and carbon dioxide from the heating chamber to the second chamber, whereby a desired concentration of the second solution is maintained in the second chamber.

15. The apparatus of claim 12 further comprising means for applying an external pressure coupled to the first chamber for increasing solvent flux through the semi-permeable membrane.

* * * * *